United States Patent [19]
Waters

[11] Patent Number: 5,632,232
[45] Date of Patent: May 27, 1997

[54] PET TRAINING SYSTEM

[75] Inventor: Michael A. Waters, Barrington Hills, Ill.

[73] Assignee: Waters Research Company, Elgin, Ill.

[21] Appl. No.: 376,754

[22] Filed: Jan. 23, 1995

[51] Int. Cl.⁶ ................................. A01K 29/00
[52] U.S. Cl. ....................................... 119/720
[58] Field of Search .................... 119/718, 719, 119/720, 721; 340/573

[56] References Cited

U.S. PATENT DOCUMENTS

| | | | |
|---|---|---|---|
| 4,967,695 | 11/1990 | Giunta | 119/721 |
| 5,241,923 | 9/1993 | Janning | 119/721 |
| 5,307,763 | 5/1994 | Arthur et al. | 119/719 X |
| 5,408,956 | 4/1995 | Quigley | 119/720 |

*Primary Examiner*—Thomas Price
*Attorney, Agent, or Firm*—Dorn, McEachran, Jambor & Keating

[57] ABSTRACT

A pet training system incorporating a transmitter and a pet collar. The transmitter includes a radio-frequency signal generator, with a power supply, for generating a low amplitude RF signal; the RF signal is applied to a radiation antenna, through appropriate connectors, so that the transmitter radiates an RF field in or around a designated area the pet is intended to avoid. The pet collar includes a receiving antenna and a shock device or other deterrent device actuated when the pet, wearing the collar, approaches the designated area. The radiation antenna includes at least three and preferably as many as eight or more series connected conductors so that the RF field extends an appreciable distance from the radiation antenna.

8 Claims, 2 Drawing Sheets

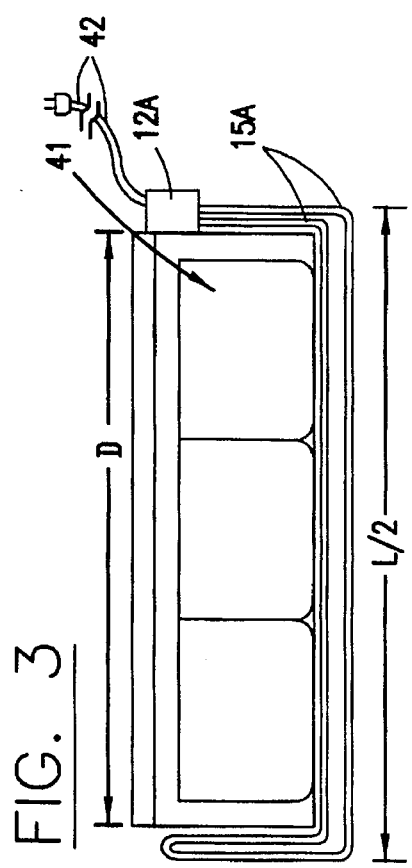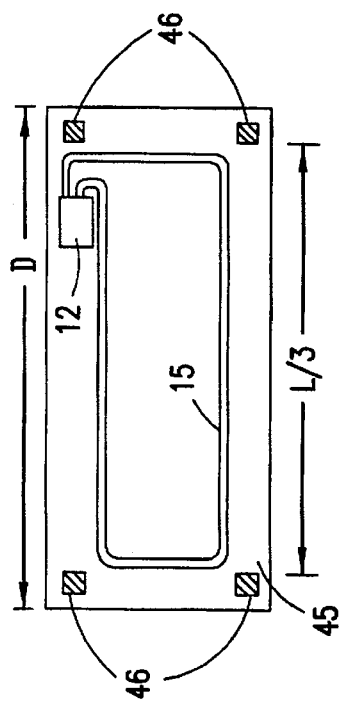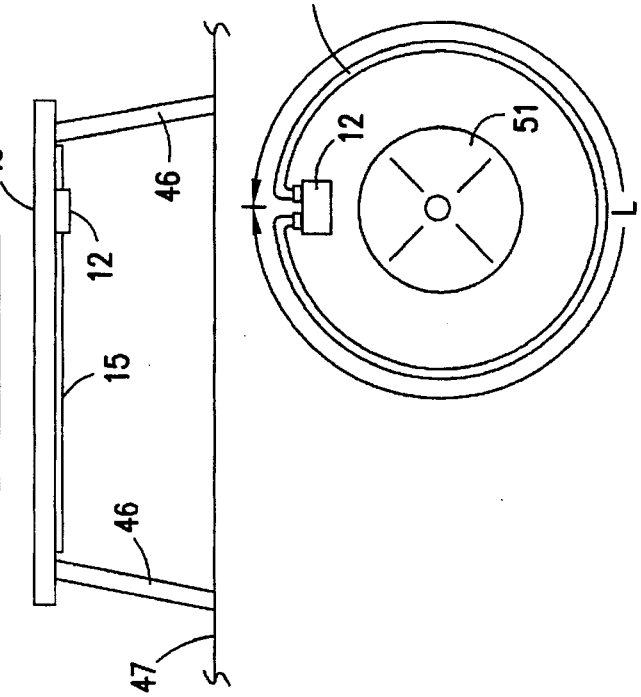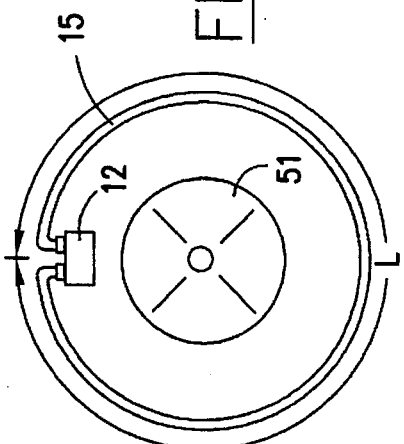

PET TRAINING SYSTEM

BACKGROUND OF THE INVENTION

A variety of electrical control systems for keeping animals or excluding those animals from a designated area have long been known. The simplest of those systems comprise electrified fences, most frequently used to control cattle and keep them in a confined area. In a system of that kind, if an animal touches the electrified fence it receives a mild shock, sufficient to turn the animal back into the designated area.

Somewhat similar systems have been applied to pets, including dogs, cats, and other relatively mobile animals. Pets can be controlled by an electrified fence. More frequently, however, the pet is equipped with a collar containing a radio-frequency receiver that is activated by an electromagnetic field radiated from an antenna that encompasses the designated area in which it is desired to keep the pet. Usually, such a radio-frequency antenna has a very limited range because interference with radio reception, television reception, and the like is not permissible. With pets, the system may be reversed and may be employed to keep the pet from entering a particular area instead of confining the pet to such an area. Most pets are considerably more intelligent than cattle and other farm animals. After a few mild shocks or other alarms produced when the pet approaches a perimeter that should not be passed, the pet will shy away from that perimeter even though the radio-frequency field may no longer be present. On the other hand, the very intelligence that makes pets trainable can sometimes work to the disadvantage of the pet owner; the pet may work out a way to avoid the confining or excluding RF field. Many prior art systems are quite unsuitable for use indoors, particularly in environments in which children may also be present.

A principal problem presented in most pet training systems that employ radio-frequency fields has to do with the distance from the antenna at which the electromagnetic radiated field is effective. The ideal antenna is a single conductive wire, encompassing the area to which a pet should be confined or from which a pet should be excluded. At acceptable energizing currents for the antenna, however, usually no more than one ampere, the effective coverage or scope of the radio-frequency field may be as low as 3 inches, about 7.5 cms. If the pet is relatively young and tends to move rapidly, this means that the pet may approach and even pass the antenna wire. Of course, the pet receives a shock or is subjected to some other kind of alarm as it passes the antenna, but this does not confine the pet to a particular area nor is it effective to exclude the pet from a designated area. To be truly effective, the radiated RF electromagnetic field from the antenna should extend outwardly from the antenna for a distance, in all directions, of at least about 10 inches (25 cms) or, even better, 16 to 20 inches (40 to 50 cms). In this way, the warning or training system applies a shock or other alarm to the pet while the pet is still moving toward the antenna and before the pet can pass the antenna. For training purposes, an arrangement of this kind is much preferable.

STATEMENT OF THE INVENTION

It is an object of the present invention, therefore, to provide a new and improved pet training system, appropriate for use indoors or outdoors, for training a pet to avoid a designated area (e.g., an item of furniture indoors or a plant or other limited area outdoors), utilizing a radio-frequency electromagnetic field of limited scope but of sufficient range so that the pet cannot readily pass through it. This object is achieved, in major part, by effectively increasing the range or scope of the radio-frequency electromagnetic field to about 10 to 20 inches (25 to 50 cms) from the radiating antenna.

Another object of the invention is to provide a new and improved pet training system, utilizing a radiated electromagnetic radio-frequency field, which system is relatively low in cost, has an extended operating life, and is suitable for use indoors or out.

Accordingly, the invention relates to a pet training system for training a pet to avoid a designated area having a maximum dimension D. The system includes a transmitter comprising a radio-frequency generator for generating an RF signal of limited amplitude; a power supply connected to the RF generator; a radiation antenna for radiating the RF signal over a limited range around the designated area, the antenna including a plurality of at least three series-connected conductors each having a length L, such that $L \geq D$; and connector means for connecting the antenna conductors in series with each other and for connecting the antenna to the RF generator. The system further includes a receiver assembly incorporated in a collar for a pet, the receiver assembly comprising a receiving antenna for receiving the RF signal radiated by the radiation antenna and alarm means for applying a deterrent (shock, audible alarm, or both to) the pet when the pet ventures into the limited range of the radiation antenna.

BRIEF DESCRIPTION OF THE DRAWINGS

FIG. 3 illustrates application of the pet training system of the invention to a sofa;

FIGS. 4A and 4B illustrate application of the pet training system to a table; and FIG. 5 illustrates the use of the system in excluding a pet from access to a plant.

DESCRIPTION OF THE PREFERRED EMBODIMENTS

Figure 1:
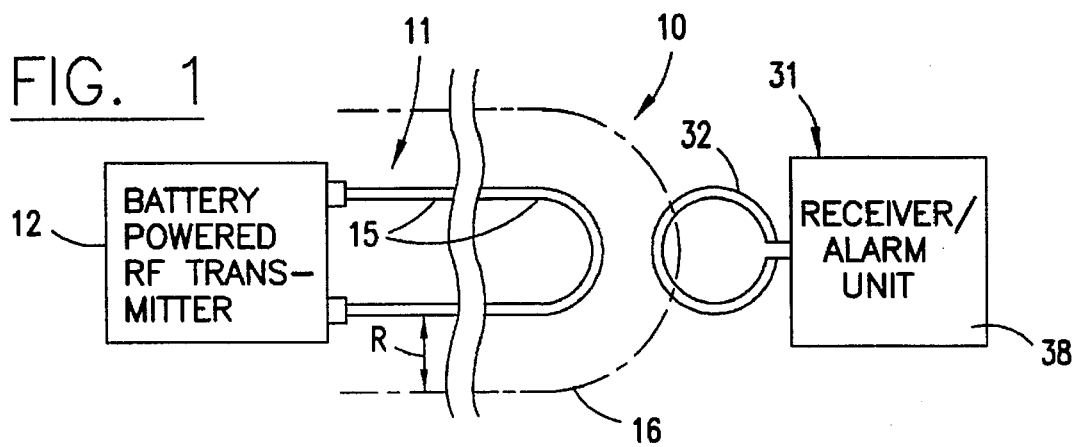
FIG. 1 is a block diagram of a pet training system constructed in accordance with a preferred embodiment of the invention.

FIG. 1 is a block diagram of a pet training system 10 constructed in accordance with a preferred embodiment of the invention. System 10 includes two independent but interrelated units, a transmitter unit 11 and a receiver unit 31. Transmitter unit 11 includes a battery powered radio-frequency generator and transmitter 12 that is electrically connected to a radiation antenna 15. Antenna 15 has a limited range R, as shown in FIG. 1 by the phantom outline 16. The frequency of the electromagnetic RF field radiated from antenna 15 is not critical to the invention but may be critical to acceptance under governmental or regulatory requirements. The preferred operating range is 8 KHz to 11 KHz.

Receiver 31 is preferably a small, compact device incorporated in a collar for a pet that is to be trained. It comprises a single conductor receiver antenna 32 that is electrically connected to a receiver and alarm unit 38. When antenna 32 projects into the radiation field 16, as shown in FIG. 1, the receiver/alarm unit 38 applies a deterrent signal to the pet so that the pet knows that it has ventured into the limited range of the radiation antenna 15. Collar-mounted receivers of this sort are known from previous developments. The deterrent supplied to the pet may be a mild electrical shock, an audio signal, or any other preferred form of deterrent that will indicate to the pet that it has entered a prohibited area.

Figure 2A:
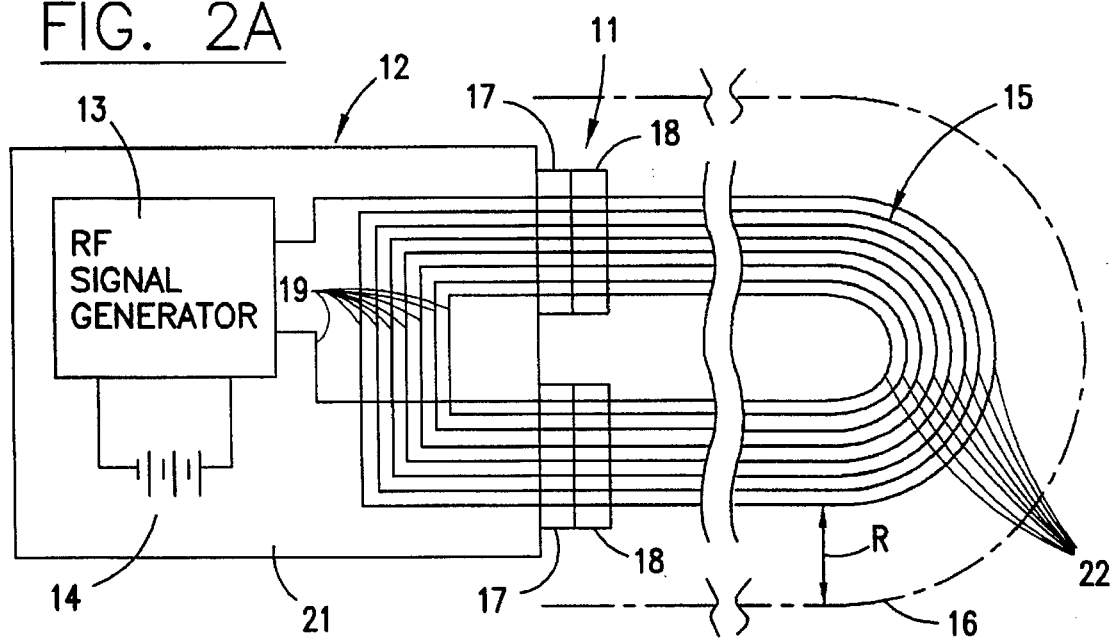
FIGS. 2A and 2B are schematic diagrams of transmitter and receiver components of the pet training system illustrated in FIG. 1.

FIG. 2A affords a more complete circuit diagram for the transmitter unit 11, including transmitter 12, for the system 10 of FIG. 1. As shown in FIG. 2A, transmitter 12 includes a radio-frequency generator 13 for generating a radio-frequency signal of given frequency and limited amplitude. The power supply for signal generator 13 is shown as a battery 14. This size and voltage for the battery are matters of design choice; a conventional 9 volt dry-cell battery is appropriate for many applications. The choice of battery for power supply 14 depends upon the requirements of signal generator 13. Of course, battery 14 may be replaced by a convertor energized from a conventional 60 Hz 120 V power supply as described more fully hereinafter in connection with FIG. 3.

Antenna 15, FIG. 2A, is not a single electrical conductor. Rather, the radiation antenna includes a plurality of at least three series-connected conductors 22. Conductors 22 could be connected in series in the antenna itself. As shown in FIG. 2A, however, the preferred construction has each of the conductors 22 connected in series through mating male and female connectors 18 and 17 and a plurality of connector conductors 19 disposed upon the surface of a printed circuit board 21. The PC board 21 is also the base for female connectors 17, in the construction shown in 2A. As in FIG. 1, transmitter unit 11 of FIG. 2A radiates the RF signal from circuit 13 throughout a limited range R, the outer limit of the range being indicated by phantom outline 16.

Figure 2B:
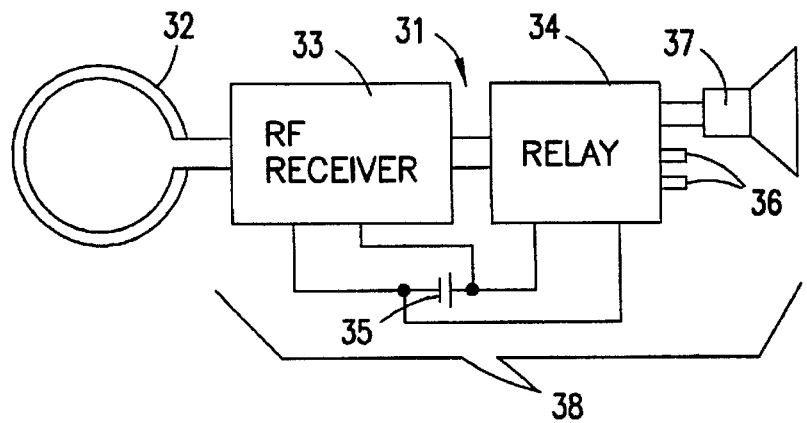

FIG. 2B affords a more detailed circuit diagram for the collar-mounted receiver 31. Receiver antenna 32, which usually encompasses the neck of a pet, is electrically connected to an RF receiver circuit 33 that is tuned to the operating frequency of the transmitter signal generator 13 and its antenna 15 (FIG. 2A). Receiver 33, FIG. 2B, drives a relay or like switching circuit 34. The two circuits 33 and 34 are energized from a small power supply 35. Usually, power supply 35 constitutes a single dry-cell battery. The output from switching or relay circuit 34 may include a pair of electrodes 36 used to give a mild shock to the pet. Relay 34 may also drive an audio deterrent device shown in FIG. 2B as a speaker 37. Deterrent arrangements 36 and 37 may be used alternatively or may be used jointly in the pet training system of the invention. Speaker 37 may prove desirable to the pet owner using the training system because it informs the pet owner when the pet tries to breach the RF field.

FIG. 3 illustrates, in a plan view, the application of a transmitter unit similar to that of FIG. 2A to a situation in which a pet is to be trained to avoid a sofa 41 which has a maximum dimension D. As applied to sofa 41, the training system includes a transmitter unit 11A that may be essentially similar to the unit 11 illustrated in FIGS. 1 and 2A except that in this instance the power supply includes a convertor to be energized from a conventional 60 Hz 120 V source. Thus, transmitter unit 11A is provided with a power cord 42. The antenna 15A of transmitter 11A, which has a length L, is disposed around the sides and across the front of the sofa. If the sofa were out in the middle of a room (it is assumed to be next to a wall) it would be desirable to arrange antenna 15A so that the return run of the antenna extends beneath the rear of the sofa. Indeed, the entire antenna 15A may be disposed underneath the sofa because the radiated field from the antenna extends outwardly from the antenna by a distance of about 16 to 20 inches (40 to 50 cms). On the other hand, antenna 15 may be disposed immediately below the cushions of sofa 41; it is not harmed by the pressure of people sitting on the sofa.

FIGS. 4A and 4B pertain to a situation in which a table having a top 45 and legs 46 constitutes the designated area that a pet is to be trained to avoid. In this instance, the transmitter 12 and antenna 15 are mounted on the underside of table top 45 with the antenna extending around the periphery of the table top. The maximum dimension D of the table determines the required length for antenna 15. As in all installations of the present invention, the overall antenna length L should be appreciably larger than dimension D. For a table, this usually requires that length L be about three times the maximum dimension D of the table (the designated area to be avoided by the pet). Any excess of antenna length can simply be formed into an additional loop so that the outline of antenna 15 is approximately the same as that of table top 45. For a small pet and high table, it may be desirable to move transmitter 12 and antenna 15 down to the floor 47. If this is done, it is preferable that the transmitter and the antenna of the training system be covered by carpet, particularly in order to avoid entanglement with a child or tripping of an adult. Of course, the system may be used to train a pet not to cross a door sill or to protect other furniture items or built-in facilities such as counters.

FIG. 5 is a plan view that illustrates how the transmitter 12 and its antenna 15 may be adapted to keep a pet away from a plant; plant 51 may be indoors or outdoors. In this instance, antenna 15 encircles plant 51. If outdoors, the antenna may be buried to a limited depth, usually a couple of inches (5 cms). Again, the antenna length L is large enough so that it exceeds the maximum dimension of the plant, in this instance the peripheral dimension of plant 51.

Other installations are readily possible, as will be apparent to any person utilizing the training system of the invention. In any instance, the training system is effective to train a pet to avoid a designated area, the principal requirement of the system being that the overall antenna length L should be appreciably larger than the largest dimension of the designated area to be protected. To get adequate range R for the field radiated by antenna 15 (see FIGS. 1 and 2A) the antenna should include at least three series-connected conductors all extending the full length of the antenna. In many instances three such conductors are not sufficient; a total of six, eight, or even more conductors, all series-connected, is preferred so that the overall limited range afforded by the antenna is sufficient to afford a deterrent signal to the pet before the pet can truly penetrate the RF field.

I claim:

1. A pet training system for training a pet to avoid a designated area having a maximum dimension D, the system including a transmitter comprising:

a radio-frequency generator for generating an RF signal of limited amplitude;

a power supply connected to the RF generator;

a radiation antenna for radiating the RF signal over a limited range around the designated area, the antenna including a plurality of at least three series-connected conductors each having a length L, such that $L \geq D$;

and connector means for connecting the antenna conductors in series with each other and for connecting the antenna to the RF generator;

the system further including a receiver assembly incorporated in a collar for a pet, the receiver assembly comprising:

a receiving antenna for receiving the RF signal radiated by the radiation antenna;

and alarm means for applying a deterrent to the pet when the pet ventures into the limited range of the radiation antenna.

2. A transmitter for a pet training system for training a pet to avoid a designated area having a maximum dimension D, the transmitter comprising:

a radio-frequency generator for generating an RF signal of limited amplitude;

a power supply connected to the RF generator;

a radiation antenna for radiating the RF signal over a limited range around the designated area, the antenna including a plurality of at least three series-connected conductors each having a length L, such that $L \geq D$;

and connector means for connecting the antenna conductors in series with each other and for connecting the antenna to the RF generator.

3. A pet training transmitter according to claim 2 in which the radio-frequency generator, the power supply, and a first part of the connector means all comprise a unitary transmitter assembly.

4. A pet training transmitter according to claim 3 in which a second part of the connector means is connected to opposite ends of the radiation antenna.

5. A pet training transmitter according to claim 4 in which the radiation antenna includes N conductors, in which the first part of the connector means and the second part of the connector means each include two connector members, each connector member including a plurality of N conductive paths, and in which the connector members of the first and second parts of the connector means interfit with each other.

6. A pet training transmitter according to claim 5 in which N=4.

7. A pet training transmitter according to claim 5 in which N=8.

8. A pet training transmitter according to claim 2 in which the frequency of the RF signal is in the range of 8 KHz to 11 KHz.

* * * * *